(12) United States Patent
Zhang et al.

(10) Patent No.: US 10,824,372 B2
(45) Date of Patent: Nov. 3, 2020

(54) DATA RECOVERY METHOD AND DEVICE, AND CLOUD STORAGE SYSTEM

(71) Applicant: Hangzhou Hikvision Digital Technology Co., Ltd., Zhejiang (CN)

(72) Inventors: Ketao Zhang, Zhejiang (CN); Aiqiu Xu, Zhejiang (CN)

(73) Assignee: Hangzhou Hikvision Digital Technology Co., Ltd. (CN)

( * ) Notice: Subject to any disclaimer, the term of this patent is extended or adjusted under 35 U.S.C. 154(b) by 92 days.

(21) Appl. No.: 16/312,587

(22) PCT Filed: Feb. 13, 2017

(86) PCT No.: PCT/CN2017/073343
§ 371 (c)(1),
(2) Date: Dec. 21, 2018

(87) PCT Pub. No.: WO2017/219678
PCT Pub. Date: Dec. 28, 2017

(65) Prior Publication Data
US 2019/0324691 A1 Oct. 24, 2019

(30) Foreign Application Priority Data
Jun. 22, 2016 (CN) .......................... 2016 1 0464595

(51) Int. Cl.
*G06F 13/00* (2006.01)
*G06F 13/28* (2006.01)
(Continued)

(52) U.S. Cl.
CPC ............ *G06F 3/0659* (2013.01); *G06F 3/065* (2013.01); *G06F 3/067* (2013.01); *G06F 3/0619* (2013.01);
(Continued)

(58) Field of Classification Search
CPC combination set(s) only.
See application file for complete search history.

(56) References Cited

U.S. PATENT DOCUMENTS

| 7,725,428 | B1 | 5/2010 | Hawkins et al. |
| 2010/0332818 | A1 | 12/2010 | Prahlad et al. |
| 2016/0110258 | A1 | 4/2016 | Haustein et al. |

FOREIGN PATENT DOCUMENTS

| CN | 101577735 A | 11/2009 |
| CN | 103729436 A | 4/2014 |

(Continued)

OTHER PUBLICATIONS

International Search Report dated Apr. 27, 2017, issued in connection with International Application No. PCT/CN2017/073343 filed on Feb. 13, 2017, 4 pages.
(Continued)

*Primary Examiner* — Yong J Choe
(74) *Attorney, Agent, or Firm* — McDonell Boehnen Hulbert & Berghoff LLP

(57) ABSTRACT

The embodiments of the present application disclose a data recovery method, device, and cloud storage system. A management node constructs a blank metadata database and sets the metadata database to an inaccessible state; reads backup data of configuration data and adds the backup data to the metadata database; obtains index data of data stored in the storage node and adds the index data to the metadata database; and sets the metadata database to an accessible state so as to cause the metadata database to resume service. It can be seen that, after applying the solution, when a metadata database is damaged, a metadata database is reconstructed, and the configuration data and the index data are obtained and added to the reconstructed database, realizing the recovery of the metadata.

17 Claims, 2 Drawing Sheets

(51) Int. Cl.
*G06F 3/06* (2006.01)
*G06F 16/22* (2019.01)
*H04L 29/08* (2006.01)

(52) U.S. Cl.
CPC ........ *G06F 3/0641* (2013.01); *G06F 16/2282* (2019.01); *H04L 67/1097* (2013.01)

(56) References Cited

FOREIGN PATENT DOCUMENTS

| | | |
|---|---|---|
| CN | 103761161 A | 4/2014 |
| CN | 105095439 A | 11/2015 |
| CN | 105515823 A | 4/2016 |
| CN | 105608155 A | 5/2016 |

OTHER PUBLICATIONS

Written Opinion dated Apr. 27, 2017, issued in connection with International Application No. PCT/CN2017/073343 filed on Feb. 13, 2017, 3 pages.

DATA RECOVERY METHOD AND DEVICE, AND CLOUD STORAGE SYSTEM

The present application is a US national phase under 35 U.S.C. § 371 of international application PCT/CN2017/073343, filed Feb. 13, 2017, which claims priority to Chinese Patent Application No. 201610464595.5, filed with China National Intellectual Property Administration on Jun. 22, 2016 and entitled "DATA RECOVERY METHOD AND DEVICE, AND CLOUD STORAGE SYSTEM", which is incorporated herein by reference in their entirety.

TECHNICAL FIELD

The present application relates to the technical field of cloud storage, and in particular, to a data recovery method, device, and cloud storage system.

BACKGROUND

With the continuous development of technology, cloud storage systems have been widely used. A cloud storage system refers to a system that integrates various types of storage devices in a network by application software through cluster application, network technology, or distributed file system, to provide a user with functions of data storage and service access. The user can conveniently access data through the cloud storage system at any time and any place.

The existing cloud storage system may include a management node (CVM, Cloud Video Management), a video access node (CVA, Cloud Video Access), and a storage node (CVS, Cloud Video Storage). The management node mainly provides management services for the cloud storage system and stores metadata. The video access node is mainly responsible for acquiring a video and storing the acquired video on the storage node. The storage node is mainly responsible for managing storage devices, and providing data writing and reading services.

The management node may store the metadata in the form of a metadata database, and the metadata database may include configuration data and index data. The configuration data refers to some basic configuration information of the cloud storage system, such as information of a video access node in the cluster, information of a storage management node in the cluster, and the like. The index data refers to address information of a video, a file, a picture or other resources that are written by a user and stored in the cloud storage system, such as device information, block information, segment information, and the like of a storage node that stores the foregoing resources. When a user submits a query request to the management node, the management node returns address information of a resource corresponding to the query request to the user through the stored index data, so that the user obtains the resource.

The above metadata database may be a distributed database, such as the Hbase database. The Hbase database is a Hadoop cluster-based database that is widely used in distributed environments. The Hadoop cluster can ensure the consistency of data in Hbase databases of nodes in the cluster. However, if the Hadoop cluster is damaged due to power outages, network disconnection, etc., the metadata in the Hbase database will be unrecoverable.

SUMMARY

The objective of the embodiments of the present application is to provide a data recovery method, device, and cloud storage system to solve the problem that metadata in the cloud storage system cannot be recovered.

To achieve the above objective, an embodiment of the present application discloses a data recovery method, which is applicable to a management node in a cloud storage system, wherein the cloud storage system further includes a storage node, and the method includes:

constructing a blank metadata database, and setting the metadata database to an inaccessible state;

reading backup data of configuration data, and adding the backup data to the metadata database;

obtaining index data of data stored in the storage node, and adding the index data to the metadata database; and setting the metadata database to an accessible state so as to cause the metadata database to resume service.

Optionally, reading backup data of configuration data, and adding the backup data to the metadata database, may include:

obtaining the backup data of the configuration data from a first file, wherein the backup data is stored in the first file in a preset storage format; and analyzing the backup data according to the preset storage format, and adding the analyzed data to the metadata database.

Optionally, the method may further include:

checking the completeness of the backup data added to the metadata database.

Optionally, obtaining index data of data stored in the storage node, and adding the index data to the metadata database, may include:

reading and analyzing an index export file in the storage node, wherein the index export file stores information of the index data of the data stored in the storage node;

analyzing the index export file;

generating the index data of the data stored in the storage node according to an analyzed result; and adding the index data to the metadata database.

Optionally, generating the index data of the data stored in the storage node according to the analyzed result, may include:

filtering the analyzed result according to a preset filtering rule; and generating the index data of the data stored in the storage node according to the analyzed result which has been filtered.

Optionally, filtering the analyzed result according to a preset filtering rule, may include:

performing deduplication on the same information in the analyzed result;

and/or deleting information in the deleting information in the analyzed result which does not match the backup data.

Optionally, adding the backup data to the metadata database, may include:

storing the index data into a preset file;

determining an import tool according to the metadata database; and adding the data in the preset file to the metadata database by using the import tool.

To achieve the above objective, an embodiment of the present application discloses a data recovery device, which is applicable to a management node in a cloud storage system, wherein the cloud storage system further includes a storage node, and the device includes:

a construction module, configured for constructing a blank metadata database, and setting the metadata database to an inaccessible state;

a first adding module, configured for reading backup data of configuration data, and adding the backup data to the metadata database;

a second adding module, configured for obtaining index data of data stored in the storage node, and adding the index data to the metadata database;

a setting module, configured for setting the metadata database to an accessible state so as to cause the metadata database to resume service.

Optionally, the first adding module may include:

a first obtaining submodule, configured for obtaining the backup data of the configuration data from a first file; wherein the backup data is stored in the first file in a preset storage format;

a first adding submodule, configured for analyzing the backup data according to the preset storage format, and adding the analyzed data to the metadata database.

Optionally, the device may further include:

a check module, configured for checking the completeness of the backup data added to the metadata database.

Optionally, the second adding module may include:

a reading and analyzing submodule, configured for reading and analyzing an index export file in the storage node, wherein the index export file stores information of the index data of the data stored in the storage node;

a generating submodule, configured for generating the index data of the data stored in the storage node according to an analyzed result; and a second adding submodule, configured for adding the index data to the metadata database.

Optionally, the generating submodule is specifically configured for:

filtering the analyzed result according to a preset filtering rule; and generating the index data of the data stored in the storage node according to the analyzed result which has been filtered.

Optionally, the generating submodule is specifically configured for:

performing deduplication on the same information in the analyzed result; and/or deleting information in the analyzed result which does not match the backup data;

generating the index data of the data stored in the storage node according to the analyzed result which has been disclosed.

Optionally, the second adding submodule is specifically configured for:

storing the index data into a preset file;

determining an import tool according to the metadata database; and adding the data in the preset file to the metadata database by using the import tool.

To achieve the above objective, an embodiment of the present application further discloses a cloud storage system, including: a management node and a storage node, wherein the management node is configured for constructing a blank metadata database, and setting the metadata database to an inaccessible state; reading backup data of configuration data, and adding the backup data to the metadata database; obtaining index data of data stored in the storage node, and adding the index data to the metadata database; and setting the metadata database to an accessible state so as to cause the metadata database to resume service;

the storage node is configured for obtaining the index data of the stored data, and sending the index data to the management node.

To achieve the above objective, an embodiment of the present application further discloses a management node, including: a housing, a processor, a memory, a circuit board, and a power supply circuit; wherein the circuit board is arranged inside a space enclosed by the housing; the processor and the memory are arranged on the circuit board; the power supply circuit is configured to supply power to various circuits or components of the management node; the memory is configured to store an executable program code; the processor executes a program corresponding to the executable program code by reading the executable program code stored in the memory, to perform the above data recovery method.

To achieve the above objective, an embodiment of the present application further provides an executable program code which performs the above data recovery method when being executed.

To achieve the above objective, an embodiment of the present application further provides a storage medium for storing an executable program code which performs the above data recovery method when being executed.

In the embodiment of the present application, the management node constructs a blank metadata database and sets the metadata database to an inaccessible state; reads backup data of configuration data and adds the backup data to the metadata database; obtains index data of data stored in the storage node and adds the index data to the metadata database; and sets the metadata database to an accessible state so as to cause the metadata database to resume service. It can be seen that, after applying the solution, when a metadata database is damaged, a metadata database is reconstructed, and the configuration data and the index data are obtained and added to the reconstructed database, realizing the recovery of the metadata.

BRIEF DESCRIPTION OF THE DRAWINGS

In order to describe the technical solutions of embodiments of the present application and of the related art more clearly, a simple introduction of the drawings required in the description of the embodiments and of the related art will be given. Obviously, the drawings described below are just for some embodiments of the present application and other drawings may be obtained by those of ordinary skills in the art based on these drawings without any creative effort.

DETAILED DESCRIPTION

To make the purposes, technical solutions, and advantages of the present application more comprehensible, the following is a detailed description of the present application with reference to the accompanying drawings and embodiments. Obviously, the described embodiments are merely a part but not all of the embodiments of the present application. Based on the embodiments of the present application, all other embodiments obtained by those of ordinary skill in the art without making creative work are within the scope of this application.

Figure 3:
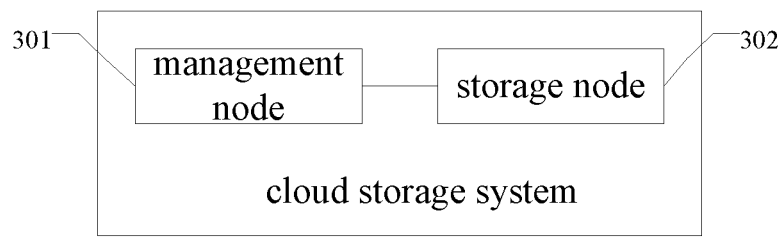
FIG. 3 is a schematic structural diagram of a cloud storage system according to an embodiment of the present application.

In order to solve the above technical problem, an embodiment of the present application provides a data recovery method, device and cloud storage system. The data recovery method and device are applied to a management node in a cloud storage system, and the cloud storage system may include a management node 301 and a storage node 302, as shown in FIG. 3. Of course, the cloud storage system may include a video access node or the like. The present application is not limited thereto. The management node stores the metadata in the form of a metadata database.

The data recovery method provided by the embodiment of the present application is first described in detail below.

Figure 1:
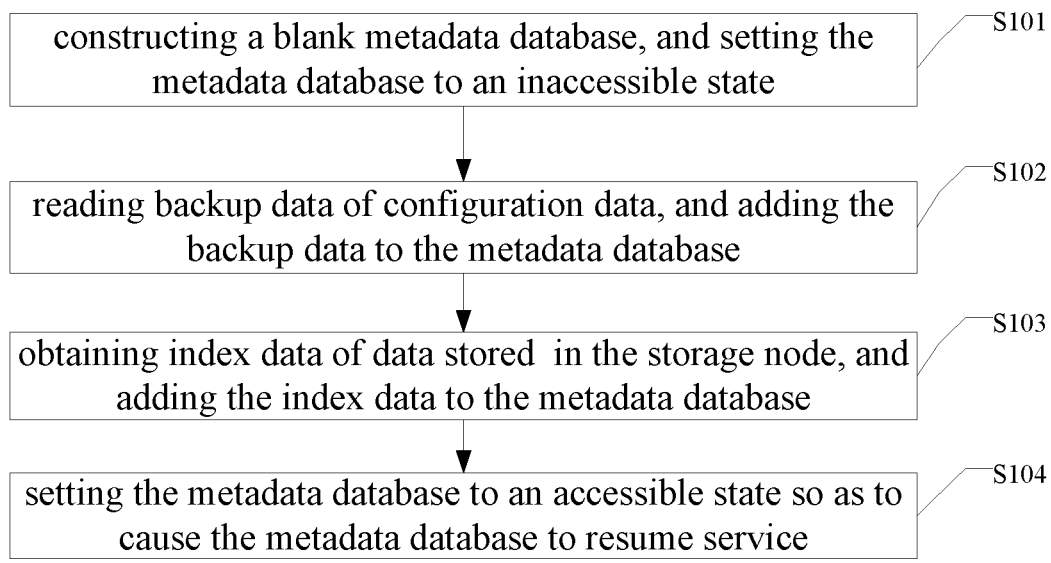
FIG. 1 is a schematic flowchart of a data recovery method according to an embodiment of the present application.

FIG. 1 is a schematic flowchart of a data recovery method according to an embodiment of the present application. The method includes the following operations.

S101: constructing a blank metadata database, and setting the metadata database to an inaccessible state.

When the power outage, network disconnection, or the like occurs, the metadata database is damaged and needs to be reconstructed. As an implementation of the present application, when the power supply is restored or the network is reconnected, the management node may be automatically triggered to perform the data recovery method provided by the embodiment of the present application. Of course, the data recovery method provided by the embodiment of the present application may also be manually triggered. This is not limited herein.

In addition, the reconstructed metadata database is a blank metadata database. Since the blank metadata database does not contain any information, and in the process of reconstructing the metadata database, the data contained in the metadata database is incomplete, the metadata database cannot be connected to the video access node or storage node before the reconstruction of the metadata data is completed, so as to prevent the metadata database from providing erroneous data. That is, the metadata database cannot provide external services. Therefore, the IP address through which the blank metadata database provides external services needs to be modified, and the metadata database needs to be set to be inaccessible, thereby avoiding that the metadata database connects to the video access node and the storage node to provide external services.

S102: reading backup data of configuration data, and adding the backup data into the metadata database.

The amount of the configuration data is small and the frequency of modifying the configuration data is low. Therefore, the management node may back up the configuration data every preset time period or when the configuration data changes, and store the backup data of the configuration data into a preset file, for example, /home/backup.txt.

Specifically, in the embodiment shown in this application, S102 may include:

obtaining backup data of the configuration data from the first file; wherein the backup data is stored in the first file in a preset storage format;

analyzing the backup data according to the preset storage format, and adding the analyzed data to the metadata database.

The above first file can be understood as a preset file. As an implementation of the application, the storage format may be determined according to attribute information of the first file, and the foregoing preset storage format may be as follows:

Poolinfo:
Poolid poolname poolsize pooltype cyclecover
Va_info:
Vaid vaname va_max_plan va_type
Vs_info:
Vsid vsName vs_size vs_type After constructing the blank metadata database, the management node obtains the backup data of the configuration data from the above/home/backup.txt. Since the backup data is stored in a preset storage format, the obtained backup data needs to be analyzed according to the preset storage format. The analyzed configuration data is added into the constructed metadata database.

Since the amount of configuration data is small and the frequency of modifying the configuration data is low, the backup and storage of the configuration data does not occupy too many resources. Furthermore, when the metadata database is reconstructed, the backup data of the configuration data can be directly added to the metadata database, which simplifies the recovery operation of the configuration data.

As an implementation of the application, the completeness of the backup data added to the metadata database may be checked. When the backup data is incomplete, prompt information may be sent to prompt the relevant personnel to perform processing.

S103: obtaining index data of data stored in the storage node, and adding the index data to the metadata database.

Index data refers to the address information of videos, files, pictures or other resources which are written by users and stored in the cloud storage system. The amount of index data is very large, and as long as a user writes new data into the cloud storage system, the index data changes. Therefore, the backup and storage of the index data will occupy a very large resource, and the frequently updating of the backup data of index data may cause the system to crash. Therefore, the index data is stored in another manner.

Specifically, in the embodiment shown in this application, S103 may include:

reading and analyzing an index export file in the storage node, wherein the index export file stores information of the index data of the data stored in the storage node;

generating the index data of the data stored in the storage node according to an analyzed result; and adding the index data to the metadata database.

In the embodiment shown in the present application, an index export unit may be run in the storage node, and the index export unit obtains index data of the stored data in the storage node by signaling interaction with the storage node. Specifically, the index export unit may be connected to a communication port 8527 of the storage node, and obtain the index data in the storage node through the communication port. The index export unit then stores the obtained index data in a fixed format in an index export file, which may be /home/index_vsid.txt.

It can be understood that a file management system can be run in the storage node, and the file management system can store index data of all the data stored in the storage node. The index export unit can obtain the index data through the file management system.

The management node reads the above index export file from the storage node. Since the index data is stored in the index export file in a fixed format, the index export file can be analyzed by using the format. Then the index data included in the analyzed result is sequentially input into the metadata database according to the format. Alternatively, the index data of the stored data in the storage node is reconstructed (i.e, rebuilt) according to the analyzed result, and the reconstructed index data is stored in the metadata database. The process of reconstructing the index data can be understood as: adjusting a storage format or storage order of the analyzed index data according to a preset mapping relationship or a preset rule, so that the adjusted index data can match the metadata database. Specifically, the analyzed index data may be reconstructed into tsv_data.txt, and the tsv_data.txt is added to the metadata database.

Since the amount of the index data is large and the frequency of modifying the index data is low, the index data is not backed up and stored, but the storage node stores the index data of the stored data therein into the index export file. In this way, there is no need to back up the index data, and only when the metadata database is reconstructed, the management node reconstructs the index data according to the index export file, and adds the reconstructed index data to the metadata database, thereby reducing the data amount and frequency of the data backup.

In the embodiment shown in the present application, generating the index data of the data stored in the storage node according to an analyzed result may include:

filtering the analyzed result according to a preset filtering rule; and generating the index data of the data stored in the storage node according to the analyzed result which has been filtered.

The analyzed result is the index data obtained through analyzing. There may be redundant or invalid index data in the index data obtained through analyzing. Therefore, the index data may be filtered first, and then the index data of the stored data in the storage node is reconstructed according to the filtered index data.

Specifically, filtering the analyzed result according to a preset filtering rule may include:

performing deduplication on the same information in the analyzed result; and/or deleting information in the analyzed result that does not match the backup data.

If there is redundant information in the index data obtained through analyzing, the deduplication is performed on the same information. In addition, the validity of the index data can be verified according to the backup data of the configuration data added to the metadata database. If the index data does not match the backup data, the index data is invalid. For example, if the backup data of the configuration data indicates that a video access node does not exist, and the index data still includes index data corresponding to the video access node, the index data corresponding to the video access node is invalid, and thus the invalid index data is deleted.

In the embodiment shown in the present application, adding index data to the metadata database may include:

storing the index data into a preset file;

determining an import tool according to the metadata database; and adding the data in the preset file to the metadata database using the import tool.

The preset file may be the above tsv_data.txt. Typically, the metadata database has a built-in import tool. Importing data into a metadata database with the built-in import tool is faster and more efficient than importing data in batch mode. Therefore, the import tool may be determined based on the metadata database. For example, a built-in import tool of the hbase database is importtsv. The tsv_data.txt is added into the hbase database through importtsv. Of course, a third-party import tool may be used to import data into the metadata database, which is not limited here.

S104: setting the metadata database to an accessible state, so as to cause the metadata database to resume service.

After the above steps, the configuration data and the index data are added to the constructed metadata database, and the metadata database can be connected with the video access node or the storage node to provide external services. Therefore, the IP address through which the metadata database provides external services needs to be re-modified to an accessible state. In this way, the recovery of the metadata database is completed.

In the embodiment shown in FIG. 1 of the present application, the management node constructs a blank metadata database and sets the metadata database to an inaccessible state; reads backup data of configuration data and adds the backup data to the metadata database; obtains index data of data stored in the storage node and adds the index data to the metadata database; and sets the metadata database to an accessible state so as to cause the metadata database to resume service. It can be seen that, after applying the solution, when a metadata database is damaged, a metadata database is reconstructed, and the configuration data and the index data are obtained and added to the reconstructed database, realizing the recovery of the metadata.

In accordance with the above-described method embodiment, the embodiment of the present application also provides a data recovery device.

Figure 2:
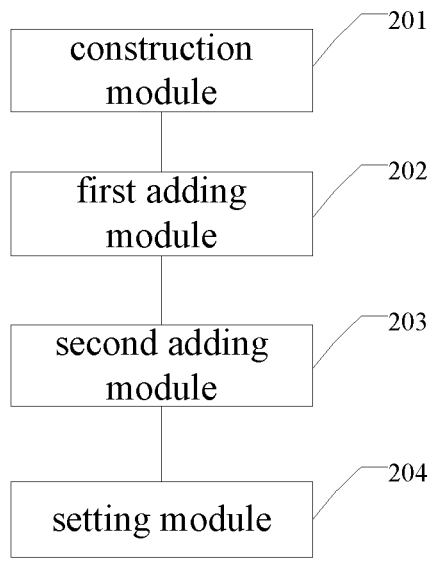
FIG. 2 is a schematic structural diagram of a data recovery device according to an embodiment of the present application.

FIG. 2 is a schematic structural diagram of a data recovery device according to an embodiment of the present application. The device includes:

a construction module 201, configured for constructing a blank metadata database, and setting the metadata database to an inaccessible state;

a first adding module 202, configured for reading backup data of configuration data, and adding the backup data to the metadata database;

a second adding module 203, configured for obtaining index data of data stored in the storage node, and adding the index data to the metadata database;

a setting module 204, configured for setting the metadata database to an accessible state so as to cause the metadata database to resume service.

In the embodiment shown in the present application, the first adding module may include: a first obtaining submodule and a first adding submodule (not shown).

The first obtaining submodule is configured for obtaining the backup data of the configuration data from a first file. The backup data is stored in the first file in a preset storage format.

The first adding submodule is configured for analyzing the backup data according to the preset storage format, and adding the analyzed data to the metadata database.

In the embodiment shown in this application, the device may further include:

a check module (not shown), configured for checking the completeness of the backup data added to the metadata database.

In the embodiment shown in the present application, the second adding module 203 may include: a reading and analyzing submodule, a generating submodule and a second adding submodule (not shown).

The reading and analyzing submodule is configured for reading and analyzing an index export file in the storage node. The index export file stores information of the index data of the data stored in the storage node.

The generating submodule is configured for generating the index data of the data stored in the storage node according to the analyzed result.

The second adding submodule is configured for adding the index data to the metadata database.

In the embodiment shown in the present application, the generating submodule may be specifically configured for:

filtering the analyzed result according to a preset filtering rule; and generating the index data of the data stored in the storage node according to the analyzed result which has been filtered.

In the embodiment shown in the present application, the generating submodule may be specifically configured for:

performing deduplication on the same information in the analyzed result; and/or deleting information in the analyzed result which does not match the backup data;

generating the index data of the data stored in the storage node according to the analyzed result which has been filtered.

In the embodiment shown in the present application, the second adding submodule may be specifically configured for:

storing the index data into a preset file;

determining an import tool according to the metadata database; and adding the data in the preset file to the metadata database by using the import tool.

In the embodiment shown in FIG. 2 of the present application, the management node constructs a blank metadata database and sets the metadata database to an inaccessible state; reads backup data of configuration data and adds the backup data to the metadata database; obtains index data of data stored in the storage node and adds the index data to the metadata database; and sets the metadata database to an accessible state so as to cause the metadata database to resume service. It can be seen that, after applying the solution, when a metadata database is damaged, a metadata database is reconstructed, and the configuration data and the index data are obtained and added to the reconstructed database, realizing the recovery of the metadata.

FIG. 3 is a schematic structural diagram of a cloud storage system according to an embodiment of the present application. The system includes:

a management node 301, configured for constructing a blank metadata database, and setting the metadata database to an inaccessible state; reading backup data of configuration data, and adding the backup data to the metadata database; obtaining index data of data stored in the storage node, and adding the index data to the metadata database; and setting the metadata database to an accessible state so as to cause the metadata database to resume service.

a storage node 302, configured for obtaining the index data of the stored data, and sending the index data to the management node.

In the embodiment shown in this application, the management node 301 may further be configured for:

obtaining the backup data of the configuration data from a first file; wherein the backup data is stored in the first file in a preset storage format; and analyzing the backup data according to the preset storage format, and adding the analyzed data to the metadata database.

In the embodiment shown in this application, the management node 301 may further be configured for:

checking the completeness of the backup data added to the metadata database.

In the embodiment shown in this application, the management node 301 may further be configured for:

reading and analyzing an index export file in the storage node, wherein the index export file stores information of the index data of the data stored in the storage node;

generating the index data of the data stored in the storage node according to an analyzed result; and adding the index data to the metadata database.

In the embodiment shown in this application, the management node 301 may further be configured for:

filtering the analyzed result according to a preset filtering rule; and generating the index data of the data stored in the storage node according to the analyzed result which has been filtered.

In the embodiment shown in this application, the management node 301 may further be configured for:

performing deduplication on the same information in the analyzed result; and/or deleting information in the analyzed result which does not match the backup data.

In the embodiment shown in this application, the management node 301 may further be configured for:

storing the index data into a preset file;

determining an import tool according to the metadata database; and adding the data in the preset file to the metadata database by using the import tool.

In the embodiment shown in FIG. 3 of the present application, the management node constructs a blank metadata database and sets the metadata database to an inaccessible state; reads backup data of configuration data and adds the backup data to the metadata database; obtaining index data of data stored in the storage node and adds the index data to the metadata database; and sets the metadata database to an accessible state so as to cause the metadata database to resume service. It can be seen that, after applying the solution, when a metadata database is damaged, a metadata database is reconstructed, and the configuration data and the index data are obtained and added to the reconstructed database, realizing the recovery of the metadata.

Figure 4:
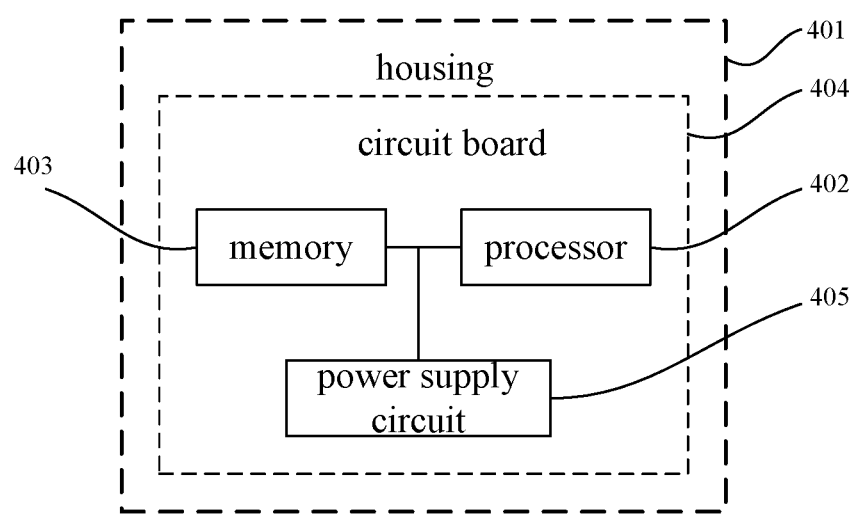
FIG. 4 is a schematic structural diagram of a management node according to an embodiment of the present application.

An embodiment of the present application further provides a management node, as shown in FIG. 4, including: a housing 401, a processor 402, a memory 403, a circuit board 404, and a power supply circuit 405. The circuit board 404 is arranged inside a space enclosed by the housing 401. The processor 402 and the memory 403 are arranged on the circuit board 404. The power supply circuit 405 is configured to supply power to various circuits or components of the management node. The memory 403 is configured to store an executable program code. The processor 402 executes a program corresponding to the executable program code by reading the executable program code stored in the memory 403, to perform the data recovery method. The method includes:

constructing a blank metadata database, and setting the metadata database to an inaccessible state;

reading backup data of configuration data, and adding the backup data to the metadata database;

obtaining index data of data stored in the storage node, and adding the index data to the metadata database; and setting the metadata database to an accessible state so as to cause the metadata database to resume service.

In the embodiment shown in FIG. 4 of the present application, the management node constructs a blank metadata database and sets the metadata database to an inaccessible state; reads backup data of configuration data and adds the backup data to the metadata database; obtains index data of data stored in the storage node and adds the index data to the metadata database; sets the metadata database to an accessible state so as to cause the metadata database to resume service. It can be seen that, after applying the solution, when a metadata database is damaged, a metadata database is reconstructed, and the configuration data and the index data are obtained and added to the reconstructed database, realizing the recovery of the metadata.

The embodiment of the present application further provides an executable program code which performs the data recovery method when being executed. The method includes:

constructing a blank metadata database, and setting the metadata database to an inaccessible state;

reading backup data of configuration data, and adding the backup data to the metadata database;

obtaining index data of data stored in the storage node, and adding the index data to the metadata database; and setting the metadata database to an accessible state so as to cause the metadata database to resume service.

In the embodiments of the present application, the management node constructs a blank metadata database and sets the metadata database to an inaccessible state; reads backup data of configuration data and adds the backup data to the metadata database; obtains index data of data stored in the storage node and adds the index data to the metadata database; and sets the metadata database to an accessible state so as to cause the metadata database to resume service. It can be seen that, after applying the solution, when a metadata database is damaged, a metadata database is reconstructed, and the configuration data and the index data are obtained and added to the reconstructed database, realizing the recovery of the metadata.

The embodiment of the present application further provides a storage medium for storing an executable program code which performs the data recovery method when being executed. The method includes:

constructing a blank metadata database, and setting the metadata database to an inaccessible state;

reading backup data of configuration data, and adding the backup data to the metadata database;

obtaining index data of data stored in the storage node, and adding the index data to the metadata database; and setting the metadata database to an accessible state so as to cause the metadata database to resume service.

In the embodiments of the present application, the management node constructs a blank metadata database and sets the metadata database to an inaccessible state; reads backup data of configuration data and adds the backup data to the metadata database; obtains index data of data stored in the storage node and adds the index data to the metadata database; and sets the metadata database to an accessible state so as to cause the metadata database to resume service. It can be seen that, after applying the solution, when a metadata database is damaged, a metadata database is reconstructed, and the configuration data and the index data are obtained and added to the reconstructed database, realizing the recovery of the metadata.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover a non-exclusive inclusion, such that processes, methods, articles, or devices comprising a series of elements comprise not only those elements listed but also those not specifically listed or the elements intrinsic to these processes, methods, articles, or equipment. Without further limitations, elements defined by the sentences "comprise(s) a . . . " or "include(s) a . . . " do not exclude that there are other identical elements in the processes, methods, articles, or devices which comprise these elements.

The embodiments in the specification are all described in related manners, and the same or similar parts among the embodiments may refer to each other, and each embodiment focuses on the difference from other embodiments. In particular, for the device embodiment, since it is basically similar to the method embodiment, the description is relatively simple, and the relevant parts can be referred to the description of the method embodiment.

It will be understood by those of ordinary skill in the art that all or some of the steps in the method described above may be accomplished by a program to instruct the associated hardware. Said program may be stored in a computer-readable storage medium, such as ROM/RAM, magnetic disks, optical disks, etc.

The above description is only for the preferred embodiment of the present application, and is not intended to limit the present application. Any modifications, equivalent substitutions, improvements, etc. made within the spirit and scope of the present application fall within the scope of the present application.

The invention claimed is:

1. A data recovery method, applicable to a management node in a cloud storage system, wherein the cloud storage system further comprises a storage node, and the method comprises:

constructing a blank metadata database, and setting the metadata database to an inaccessible state;

reading backup data of configuration data, and adding the backup data to the metadata database;

obtaining index data of data stored in the storage node, and adding the index data to the metadata database; and setting the metadata database to an accessible state, so as to cause the metadata database to resume service.

2. The method of claim 1, wherein, reading backup data of configuration data, and adding the backup data to the metadata database comprises:

obtaining the backup data of the configuration data from a first file, wherein the backup data is stored in the first file in a preset storage format; and analyzing the backup data according to the preset storage format, and adding the analyzed data to the metadata database.

3. The method of claim 1, further comprising:

checking the completeness of the backup data added to the metadata database.

4. The method of claim 1, wherein obtaining index data of data stored in the storage node, and adding the index data to the metadata database, comprises:

reading and analyzing an index export file in the storage node, wherein the index export file stores information of the index data of the data stored in the storage node;

generating the index data of the data stored in the storage node according to an analyzed result; and adding the index data to the metadata database.

5. The method of claim 4, wherein generating the index data of the data stored in the storage node according to an analyzed result, comprises:
   filtering the analyzed result according to a preset filtering rule; and
   generating the index data of the data stored in the storage node according to the analyzed result that has been filtered.

6. The method of claim 5, wherein filtering the analyzed result according to a preset filtering rule comprises:
   performing deduplication on the same information in the analyzed result; and/or
   deleting information in the analyzed result which does not match the backup data.

7. The method of claim 4, wherein adding the index data to the metadata database comprises:
   storing the index data into a preset file;
   determining an import tool according to the metadata database; and
   adding the data in the preset file to the metadata database by using the import tool.

8. A management node comprising: a housing, a processor, a memory, a circuit board, and a power supply circuit; wherein the circuit board is arranged inside a space enclosed by the housing; the processor and the memory are arranged on the circuit board; the power supply circuit is configured to supply power to various circuits or components of the management node; the memory is configured to store an executable program code; the processor executes a program corresponding to the executable program code by reading the executable program code stored in the memory, to perform the data recovery method of claim 1.

9. A non-transitory storage medium, wherein the storage medium is used to store an executable program code which performs the data recovery method of claim 1 when being executed.

10. A data recovery device, applicable to a management node in a cloud storage system, wherein the cloud storage system further comprises a storage node, and the device comprises:
   a construction module, configured for constructing a blank metadata database, and setting the metadata database to an inaccessible state;
   a first adding module, configured for reading backup data of configuration data, and adding the backup data to the metadata database;
   a second adding module, configured for obtaining index data of data stored in the storage node, and adding the index data to the metadata database; and
   a setting module, configured for setting the metadata database to an accessible state, so as to cause the metadata database to resume service.

11. The device of claim 10, wherein the first adding module comprises:
   a first obtaining submodule, configured for obtaining the backup data of the configuration data from a first file, wherein the backup data is stored in the first file in a preset storage format; and
   a first adding submodule, configured for analyzing the backup data according to the preset storage format, and adding the analyzed data to the metadata database.

12. The device of claim 10, further comprising:
   a check module, configured for checking the completeness of the backup data added to the metadata database.

13. The device of claim 10, wherein the second adding module comprises:
   a reading and analyzing submodule, configured for reading and analyzing an index export file in the storage node, wherein the index export file stores information of the index data of the data stored in the storage node;
   a generating submodule, configured for generating the index data of the data stored in the storage node according to an analyzed result; and
   a second adding submodule, configured for adding the index data to the metadata database.

14. The device of claim 13, wherein the generating submodule is further configured for:
   filtering the analyzed result according to a preset filtering rule; and
   generating the index data of the data stored in the storage node according to the analyzed result which has been filtered.

15. The device of claim 13, wherein the generating submodule is further configured for:
   performing deduplication on the same information in the analyzed result; and/or
   deleting information in the analyzed result which does not match the backup data;
   generating the index data of the data stored in the storage node according to the analyzed result which has been filtered.

16. The device of claim 13, wherein the second adding submodule is further configured for:
   storing the index data into a preset file;
   determining an import tool according to the metadata database; and
   adding the data in the preset file to the metadata database by using the import tool.

17. A cloud storage system, comprising: a management node and a storage node, wherein
   the management node is configured for constructing a blank metadata database, and setting the metadata database to an inaccessible state; reading backup data of configuration data, and adding the backup data to the metadata database; obtaining index data of data stored in the storage node, and adding the index data to the metadata database; and setting the metadata database to an accessible state so as to cause the metadata database to resume service; and
   the storage node is configured for obtaining the index data of the stored data, and sending the index data to the management node.

* * * * *